US 11,724,323 B2
(12) United States Patent
Tanaka et al.

(10) Patent No.: US 11,724,323 B2
(45) Date of Patent: Aug. 15, 2023

(54) REAMER

(71) Applicant: A.L.M.T. Corp., Tokyo (JP)

(72) Inventors: Sakuya Tanaka, Kato (JP); Koji Sawa, Kato (JP)

(73) Assignee: A.L.M.T. CORP., Tokyo (JP)

( * ) Notice: Subject to any disclaimer, the term of this patent is extended or adjusted under 35 U.S.C. 154(b) by 0 days.

(21) Appl. No.: 16/973,716

(22) PCT Filed: Apr. 3, 2019

(86) PCT No.: PCT/JP2019/014770
§ 371 (c)(1),
(2) Date: Dec. 9, 2020

(87) PCT Pub. No.: WO2020/003679
PCT Pub. Date: Jan. 2, 2020

(65) Prior Publication Data
US 2021/0245276 A1  Aug. 12, 2021

(30) Foreign Application Priority Data

Jun. 28, 2018 (JP) ................................. 2018-123495

(51) Int. Cl.
*B23D 77/00* (2006.01)
*B23D 77/02* (2006.01)
(52) U.S. Cl.
CPC ............. *B23D 77/00* (2013.01); *B23D 77/02* (2013.01); *B23D 2277/105* (2013.01); *B23D 2277/72* (2013.01)
(58) Field of Classification Search
CPC ............. B23D 77/00; B23D 2277/105; B23D 2277/72; B23D 77/02; B23D 77/003;
(Continued)

(56) References Cited

U.S. PATENT DOCUMENTS 2,923,181 A * 2/1960 Grage ..................... B24B 39/02
29/90.01
6,206,617 B1  3/2001 Kawazoe et al.
(Continued)

FOREIGN PATENT DOCUMENTS

CN  101920354 A  12/2010
CN  103128373 A   6/2013
(Continued)

OTHER PUBLICATIONS

Notice of Grounds of Rejection issued in Japanese Patent Application No. 2019-551420 dated Jan. 7, 2020.
(Continued)

*Primary Examiner* — Eric A. Gates
(74) *Attorney, Agent, or Firm* — McCarter & English, LLP; Michael A. Sartori

(57) ABSTRACT

A reamer incudes a core and a plurality of outer-circumference cutting edges provided on an outer circumference of the core and made of a hard tool material. The core extends from a front end to a rear end. The core is provided with a plurality of flutes from the front end to the rear end. A center-of-gravity adjustment portion, which adjusts a distance from a center of rotation to a center of gravity, is provided at least partially from terminal ends of the plurality of flutes on a rear end side to the rear end of the core. The center-of-gravity adjustment portion causes the deviation of the center of gravity from the center of rotation to be smaller than when no center-of-gravity adjustment portion is provided.

2 Claims, 11 Drawing Sheets

(58) Field of Classification Search
CPC .......... B23D 2277/44; B23D 2277/04; B23D 2277/204; B23D 2277/08; B23B 2231/0252; B23B 2231/0256; B23B 2231/0276; B23B 29/022; B23B 27/002; B23B 2250/16; B23B 2251/70
See application file for complete search history.

(56) References Cited

U.S. PATENT DOCUMENTS

| | | | |
|---|---|---|---|
| 6,379,090 | B1 | 4/2002 | Halley et al. |
| 7,591,209 | B2 * | 9/2009 | Murakami .......... B23B 27/002 82/158 |
| 2004/0028490 | A1 * | 2/2004 | Bergholt .......... F16F 15/10 408/199 |
| 2005/0169721 | A1 | 8/2005 | Schulte |
| 2012/0275875 | A1 | 11/2012 | Gischus et al. |
| 2015/0151373 | A1 | 6/2015 | Dejaune et al. |
| 2016/0052072 | A1 | 2/2016 | Davis et al. |

FOREIGN PATENT DOCUMENTS

| | | | |
|---|---|---|---|
| CN | 105382317 | A | 3/2016 |
| DE | 3918033 | A1 | 12/1990 |
| EP | 0195838 | A1 | 10/1986 |
| JP | S6393519 | A | 4/1988 |
| JP | H04-063316 | U | 5/1992 |
| JP | H05-029622 | U | 4/1993 |
| JP | 2000-176739 | A | 6/2000 |
| JP | 2001-113413 | A | 4/2001 |
| JP | 2002-126946 | A | 5/2002 |
| JP | 2003-266240 | A | 9/2003 |
| JP | 2005-193349 | A | 7/2005 |
| JP | 2006-088242 | A | 4/2006 |
| JP | 2008-194779 | A | 8/2008 |
| JP | 2009-083078 | A | 4/2009 |
| JP | 2011-062790 | A | 3/2011 |
| JP | 1970960 | B2 | 7/2012 |
| JP | 2015-522432 | A | 8/2015 |
| JP | 2016-032863 | A | 3/2016 |
| JP | 6458851 | B1 | 1/2019 |

OTHER PUBLICATIONS

Decision to Grant Patent issued in Japanese Patent Application No. 2019-551420 dated Apr. 14, 2020.
Aug. 1, 2022 Communication issued in Indian Application No. 202017052936.
Office Action in counterpart China Application No. 201980043581.8 dated Mar. 24, 2023.

* cited by examiner

＃ REAMER

TECHNICAL FIELD

The present invention relates to reamers. The present application claims a priority based on Japanese Patent Application No. 2018-123495 filed on Jun. 28, 2018, the entire contents of which are incorporated herein by reference.

BACKGROUND ART

Reamers have conventionally been disclosed in PTL 1 (Japanese Patent Laying-Open No. 2006-88242), PTL 2 (Japanese Patent Laying-Open No. 2011-62790), and PTL 3 (Japanese Patent Laying-Open No. 2016-32863).

CITATION LIST

Patent Literature

PTL 1: Japanese Patent Laying-Open No. 2006-88242
PTL 2: Japanese Patent Laying-Open No. 2011-62790
PTL 3: Japanese Patent Laying-Open No. 2016-32863

SUMMARY OF INVENTION

A reamer according to an aspect of the present invention includes a core and a plurality of outer-circumference cutting edges provided on an outer circumference of the core and made of a hard tool material, the core extending from a front end to a rear end, the core being provided with a plurality of flutes extending from the front end to the rear end, a center-of-gravity adjustment portion being provided at least partially from terminal ends of the plurality of flutes on the rear end side to the rear end of the core, the center-of-gravity adjustment portion adjusting a distance from a center of rotation to a center of gravity, the center-of-gravity adjustment portion causing the distance from the center of rotation to the center of gravity to be smaller than when the center-of-gravity adjustment portion is not provided.

DESCRIPTION OF EMBODIMENTS

Figure 1:
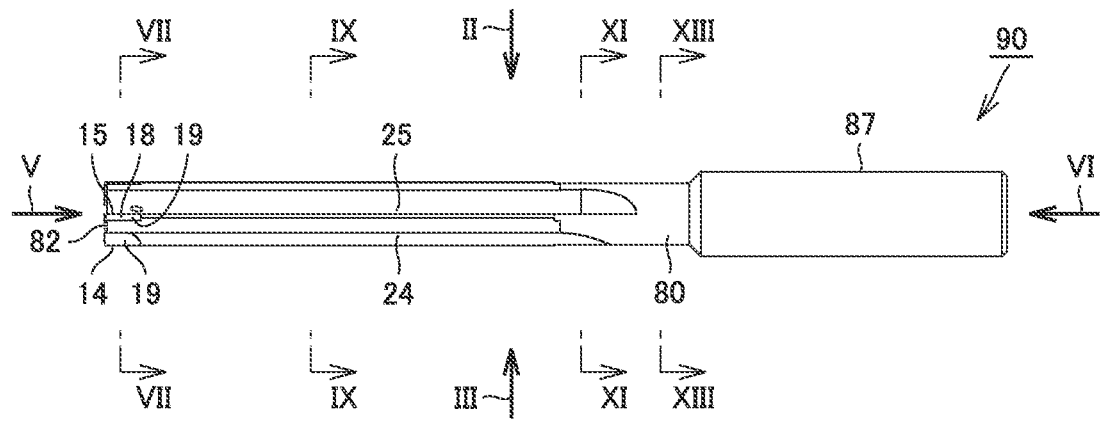
FIG. 1 is a front view of a reamer according to Embodiment 1.

Problem to be Solved by the Present Disclosure

A conventional reamer may fail to reduce cylindricity and roundness of a workpiece.

The present invention has been made to solve the above problem, and therefore has an object to provide a reamer capable of reducing cylindricity and roundness of a workpiece.

Effects of the Present Disclosure

The present invention can provide a reamer capable of reducing cylindricity and roundness of a workpiece.

Description of Embodiments the Present Invention

First, embodiments of the present invention are listed and described.

A reamer according to an aspect of the present invention includes a core and a plurality of outer-circumference cutting edges provided on an outer circumference of the core and made of a hard tool material, the core extending from a front end to a rear end, the core being provided with a plurality of flutes extending from the front end to the rear end, a center-of-gravity adjustment portion being provided at least partially from terminal ends of the plurality of flutes on a rear end side to the rear end of the core, the center-of-gravity adjustment portion adjusting a distance from a center of rotation to a center of gravity, the center-of-gravity adjustment portion causing the distance from the center of rotation to the center of gravity to be smaller than when the center-of-gravity adjustment portion is not provided.

In the reamer configured as described above, the center-of-gravity adjustment portion that adjusts the position of the center of gravity from the center of rotation is provided at least partially from the terminal ends of the plurality of flutes on the rear end side to the rear end of the core, and the center-of-gravity adjustment portion is provided in such a part, and accordingly, is positioned so as not to contact a workpiece in cutting. This enables adjustment of the center of gravity without affecting cutting performance.

Preferably, the center-of-gravity adjustment portion is the terminal ends of the plurality of flutes, where the terminal ends are provided at different positions in an axial direction. In this case, the center-of-gravity adjustment portion can be formed by providing the terminal ends of the plurality of flutes at different positions. This can provide the center-of-gravity adjustment portion with a simple configuration.

Preferably, the center-of-gravity adjustment portion is a lightened portion provided at a terminal end of one of the plurality of flutes. In this case, the center-of-gravity adjustment portion can be provided by merely removing the material of a part of the core.

Preferably, the core has a shank that held by a machine tool, and the center-of-gravity adjustment portion is provided in the shank. In this case, since the shank is provided with the center-of-gravity adjustment portion, the center-of-gravity adjustment portion can be provided at various positions in the shank, leading to enhanced flexibility of design.

Preferably, the plurality of outer-circumference cutting edges have first to third outer-circumference cutting edges adjacent to each other, and a phase difference between the first and second outer-circumference cutting edges is smaller than a phase difference between the second and third outer-circumference cutting edges. Although in this case, the first to third cutting edges are disposed at irregular intervals, and accordingly, the center of gravity easily deviates from the center of rotation, the center of gravity can be adjusted by the center-of-gravity adjustment portion.

Preferably, the center-of-gravity adjustment portion is provided at a phase corresponding to between the first and second outer-circumference cutting edges. Although in this case, since the phase is small between the first and second cutting edges, the center of gravity is easily biased toward between the first and second cutting edges, the center-of-gravity adjustment portion provided at the phase corresponding to between the first and second cutting edges can adjust the center of gravity.

Embodiment 1

Figure 2:
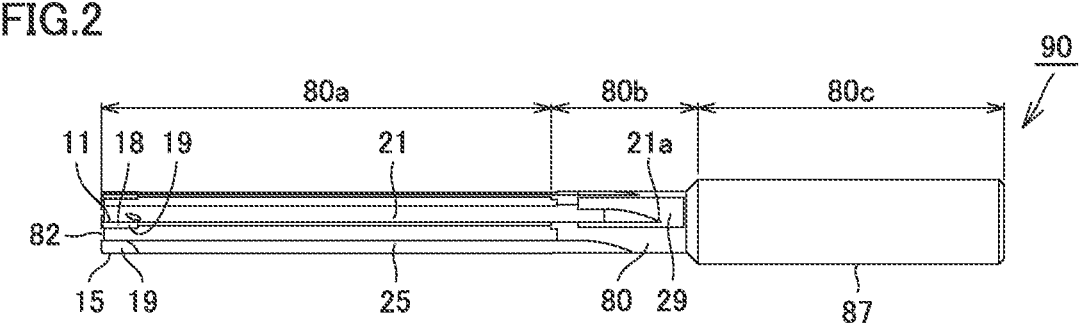
FIG. 2 is a plan view of the reamer as viewed from the direction indicated by the arrow II in FIG. 1.
Figure 3:
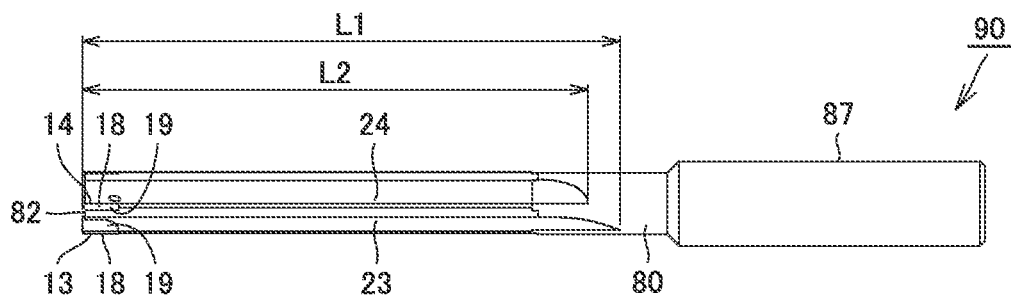
FIG. 3 is a bottom view of the reamer as viewed from the direction indicated by the arrow III in FIG. 1.
Figure 4:
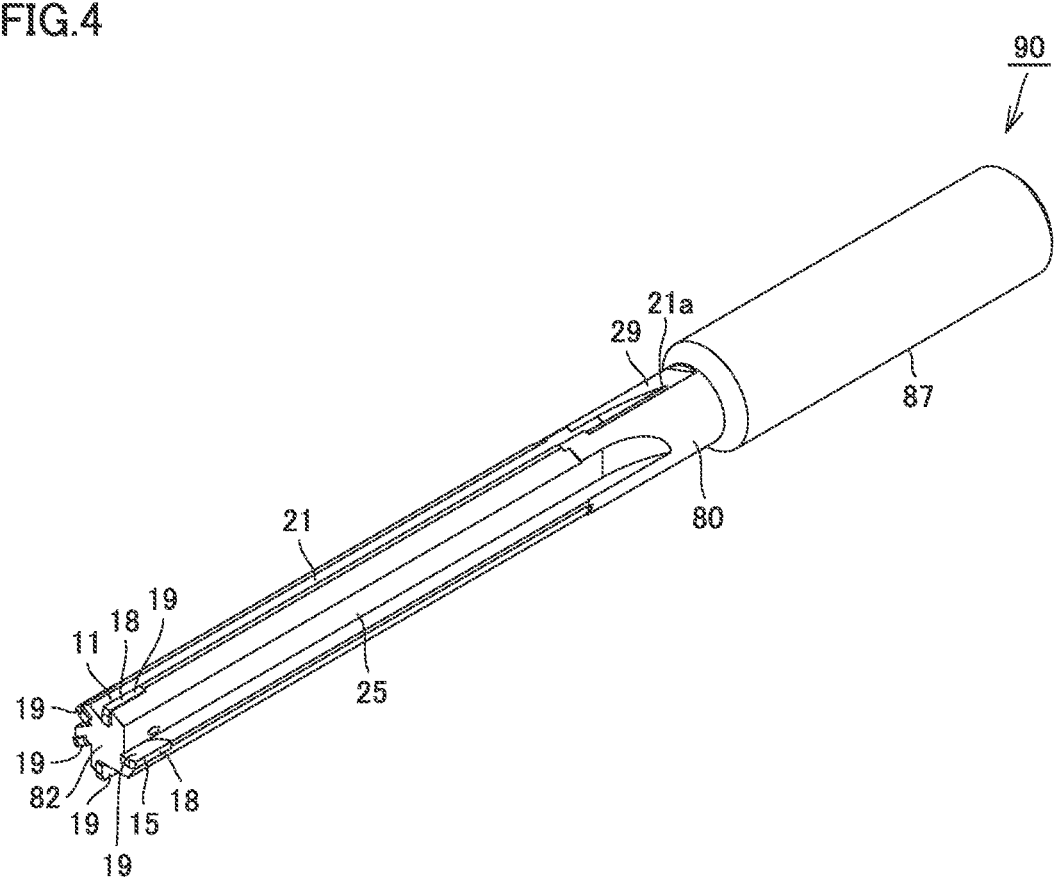
FIG. 4 is a perspective view of the reamer according to Embodiment 1.
Figure 5:
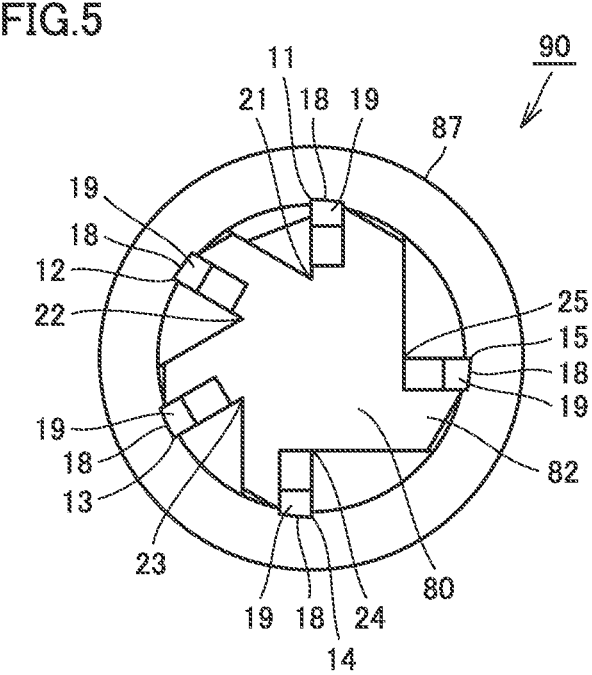
FIG. 5 is a left lateral view of the reamer as viewed from the direction indicated by the arrow V in FIG. 1.

FIG. 1 is a front view of a reamer according to Embodiment 1. FIG. 2 is a plan view of the reamer as viewed from the direction indicated by the arrow II in FIG. 1. FIG. 3 is a bottom view of the reamer as viewed from the direction indicated by the arrow III in FIG. 1. FIG. 4 is a perspective view of the reamer according to Embodiment 1. FIG. 5 is a left lateral view of the reamer as viewed from the direction indicated by the arrow V in FIG. 1.

As shown in FIGS. 1 to 5, a reamer 90 includes a core 80 and a plurality of outer-circumference cutting edges 11 to 15, which are provided on the outer circumference of core 80 and made of diamond or CBN, which is a hard tool material. Core 80 extends from a front end 82 to a rear end (shank 87) of reamer 90. Core 80 is provided with a plurality of flutes 21 to 25 from front end 82 to the rear end of core 80. A lightened portion 29, which serves as a center-of-gravity adjustment portion that adjusts a deviation of the position of the center of gravity from the center of rotation, is provided at least partially from the terminal end of flute 21 on the rear end side to a rear end of core 80. The center-of-gravity adjustment portion causes a deviation from the center of gravity to be smaller than when the center-of-gravity adjustment portion is not provided.

Shank 87 has a circular cylindrical shape in the present embodiment, but has any other shape, such as a rectangular cylindrical shape, a truncated cone shape, or a truncated pyramid shape.

Flutes 21 to 25 extend linearly in parallel with the axis of rotation in the present embodiment. However, flutes 21 to 25 may extend in a curve. Further, flutes 21 to 25 may extend linearly while inclining toward the axis of rotation. Flutes 21 and 23 each have a length L1, which is larger than a length L2 of flute 24.

A region with a predetermined length from front end 82 of reamer 90 is a cutting edge effective region 80a, a region of reamer 90 on the rear end side is a chuck region 80c, and a region between these regions is a balance adjustment region 80b.

In the present embodiment, an angle between outer-circumference cutting edge 11 and outer-circumference cutting edge 12 is 60°, an angle between outer-circumference cutting edge 12 and outer-circumference cutting edge 13 is 60°, an angle between outer-circumference cutting edge 13 and outer-circumference cutting edge 14 is 60°, an angle between outer-circumference cutting edge 14 and outer-circumference cutting edge 15 is 90°, and an angle between outer-circumference cutting edge 15 and outer-circumference cutting edge 11 is 90°. However, angles other than these angles may be provided.

A hard tool insert 19 has outer-circumference cutting edges 11 to 15 and margins 18, each of which is provided on the rear side of a corresponding one of outer-circumference cutting edges 11 to 15 in the rotational direction. Margin 18 is a part that contacts the workpiece in rotary cutting. Referring to FIG. 2, margin 18 is formed of hard tool insert 19 and a platform. However, margin 18 may be formed of hard tool insert 19 alone.

Figure 6:
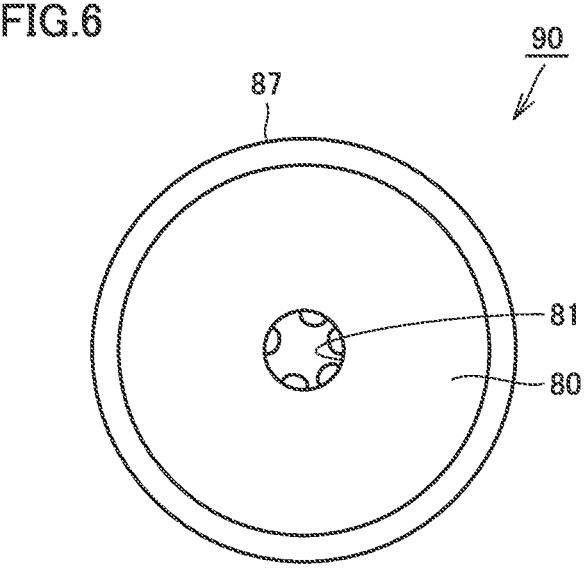
FIG. 6 is a right lateral view of the reamer as viewed from the direction indicated by the arrow VI in FIG. 1.

FIG. 6 is a right lateral view of the reamer as viewed from the direction indicated by the arrow VI in FIG. 1. As shown in FIG. 6, core 80 is provided with an oil hole 81. Oil hole 81 extends in the axial direction of core 80.

Figure 7:
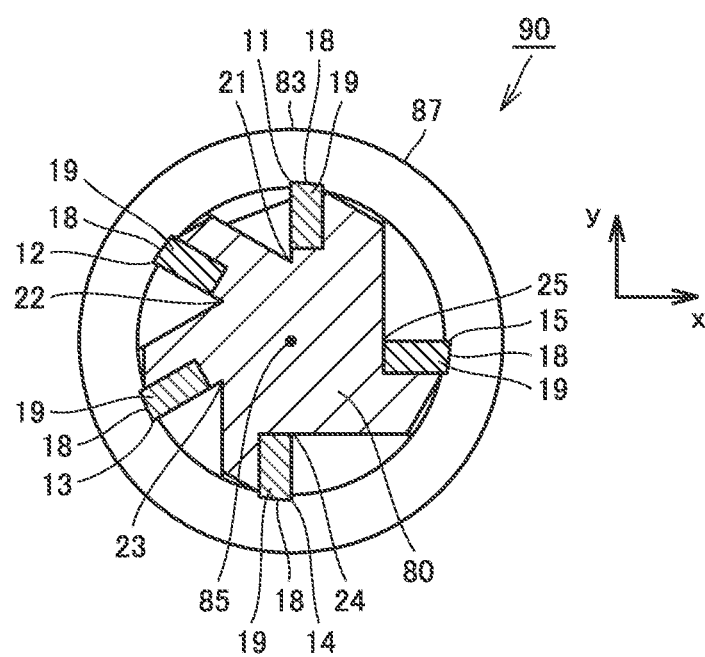
FIG. 7 is a sectional view taken along the line VII-VII in FIG. 1.
Figure 8:
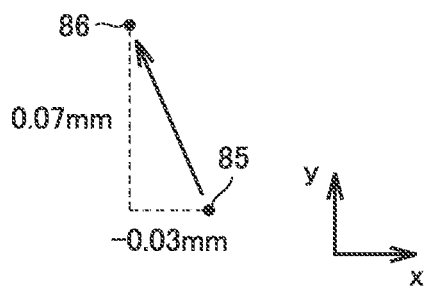
FIG. 8 shows a deviation of the center of gravity from the center of rotation of the reamer in the cross section shown in FIG. 7.

FIG. 7 is a sectional view taken along the line VII-VII in FIG. 1. FIG. 8 shows a deviation of the center of gravity from the center of rotation of the reamer in the cross section shown in FIG. 7. As shown in FIGS. 7 and 8, a center of gravity 86 in the cross section deviates from a center of rotation 85, which is the axis of rotation, in the x-axis direction and the y-axis direction. In this cross section, the center of gravity deviates toward outer-circumference cutting edges 11 to 13. This is because the ratio of core 80 is larger on the side on which outer-circumference cutting edges 11 to 13 are provided.

Figure 9:
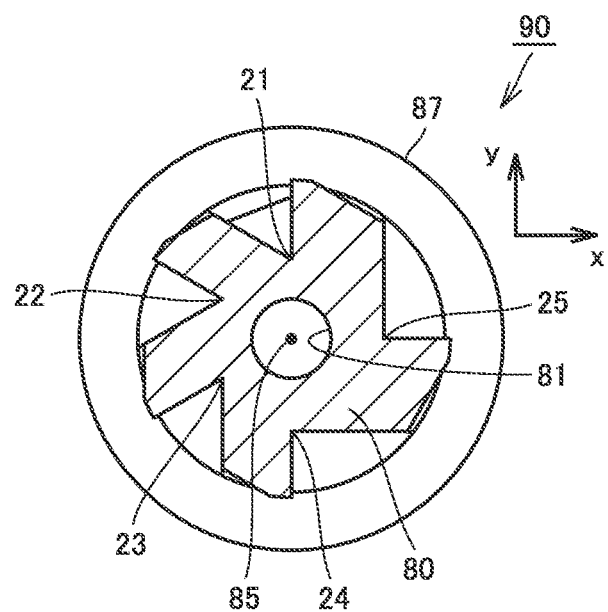
FIG. 9 is a sectional view taken along the line IX-IX in FIG. 1.
Figure 10:
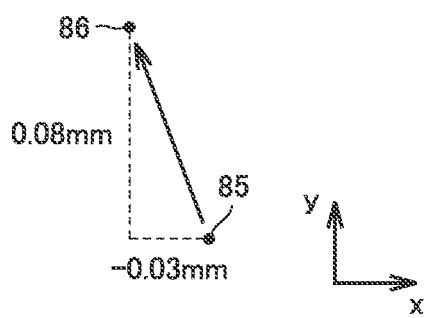
FIG. 10 shows a deviation of the center of gravity from the center of rotation of the reamer in the cross section shown in FIG. 9.

FIG. 9 is a sectional view taken along the line IX-IX in FIG. 1. FIG. 10 shows a deviation of the center of gravity from the center of rotation of the reamer in the cross section shown in FIG. 9. As shown in FIGS. 9 and 10, center of gravity 86 in the cross section deviates from center of rotation 85 in the x-axis direction and the y-axis direction. In this cross section, the center of gravity deviates toward flutes 21 to 23. This is because the ratio of core 80 is larger on the side on which flutes 21 to 23 are provided.

Figure 11:
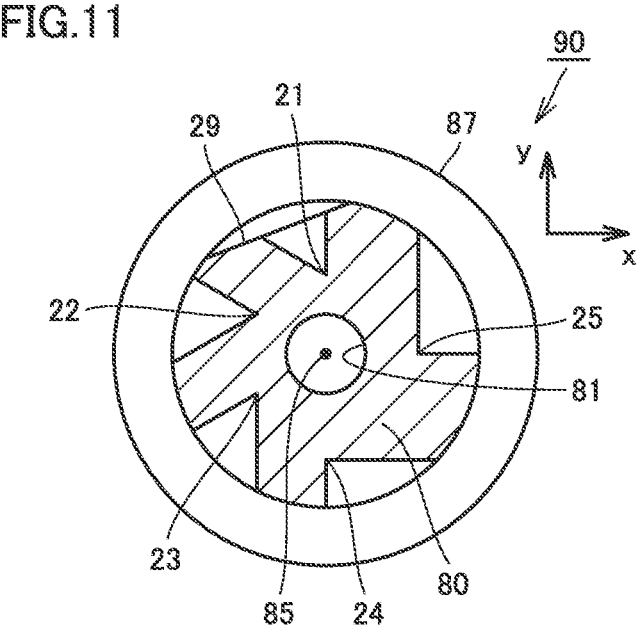
FIG. 11 is a sectional view taken along the line XI-XI in FIG. 1.
Figure 12:
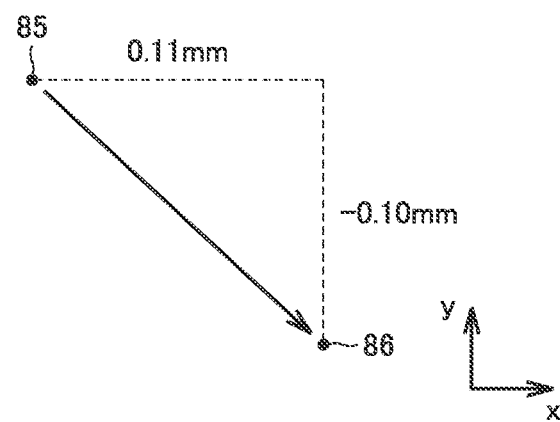
FIG. 12 shows a deviation of the center of gravity from the center of rotation of the reamer in the cross section shown in FIG. 11.

FIG. 11 is a sectional view taken along the line XI-XI in FIG. 1. FIG. 12 shows a deviation of the center of gravity from the center of rotation of the reamer in the cross section shown in FIG. 11. As shown in FIGS. 11 and 12, center of gravity 86 in the cross section deviates from center of rotation 85 in the x-axis direction and the y-axis direction. In this cross section, the center of gravity deviates toward flute 24 from the following reason. Since lightened portion 29 is formed and flute 24 is smaller, the ratio of core 80 is larger on the flute 24 side.

Figure 13:
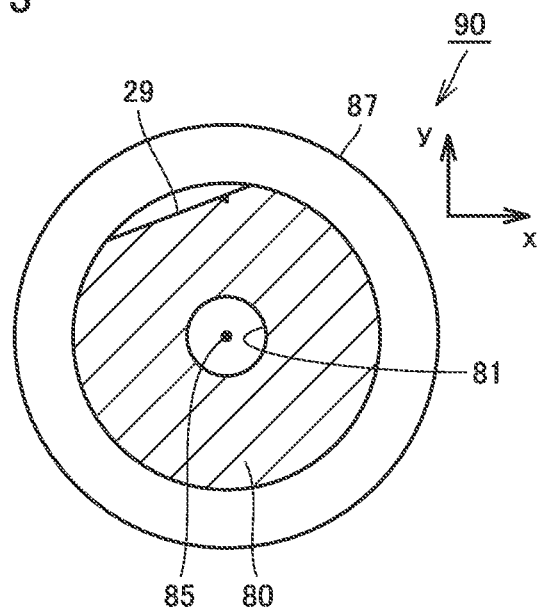
FIG. 13 is a sectional view taken along the line XIII-XIII in FIG. 1.
Figure 14:
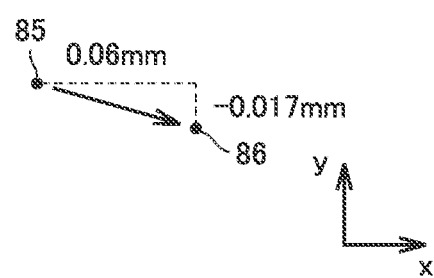
FIG. 14 shows a deviation of the center of gravity from the center of rotation of the reamer in the cross section shown in FIG. 13.

FIG. 13 is a sectional view taken along the line XIII-XIII in FIG. 1. FIG. 14 shows a deviation of the center of gravity from the center of rotation of the reamer in the cross section shown in FIG. 13. As shown in FIGS. 13 and 14, center of gravity 86 in the cross section deviates from center of rotation 85 in the x-axis direction and the y-axis direction. In this cross section, center of gravity 86 deviates opposite to lightened portion 29. Although lightened portion 29 is a part having a rotational diameter smaller than that of its surrounding part, lightened portion 29 differs from flutes 21 to 25. Flutes 21 to 25 have the function of removing chips, whereas lightened portion 29 does not have the function of removing chips. Lightened portion 29 may be a curved surface or a plane (with a curvature of zero).

In Embodiment 1, the center-of-gravity adjustment portion is the terminal ends of flutes 21 to 25, which are provided at different positions in the axial direction. In other words, the center-of-gravity adjustment portion may be configured by providing the terminal ends (e.g., 21a) of flutes 21 to 25 at different positions without lightened portion 29.

Outer-circumference cutting edges 11 to 15 have first to third outer-circumference cutting edges 12, 11, and 15 adjacent to each other, and a phase difference between first and second outer-circumference cutting edges 12 and 11 is smaller than a phase difference between second and third outer-circumference cutting edges 11 and 15. Lightened portion 29 is provided at a phase corresponding to between outer-circumference cutting edges 11 and 12.

Embodiment 2

Figure 15:
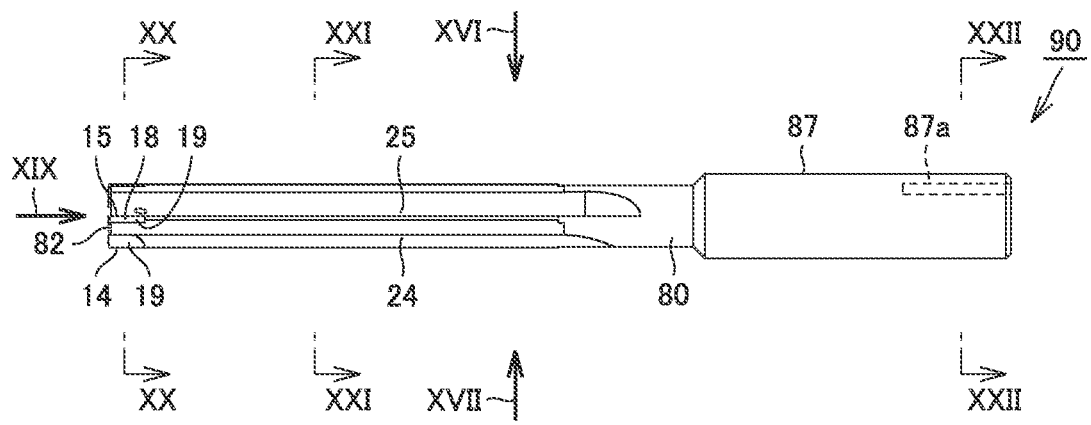
FIG. 15 is a front view of a reamer according to Embodiment 2.
Figure 16:
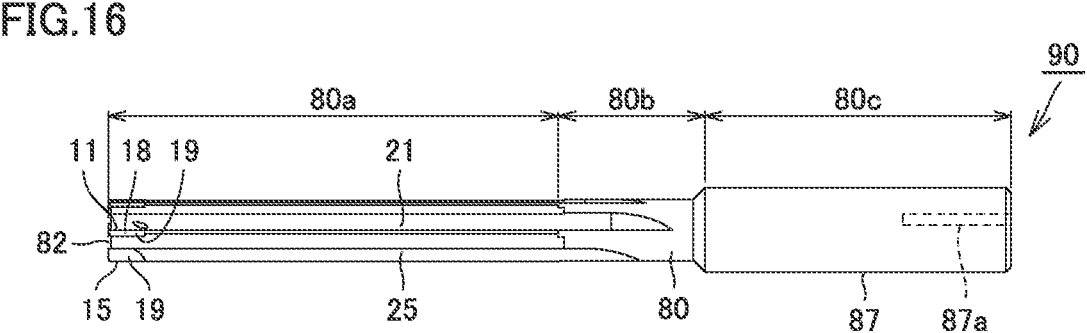
FIG. 16 is a plan view of the reamer as viewed from the direction indicated by the arrow XVI in FIG. 15.
Figure 17:
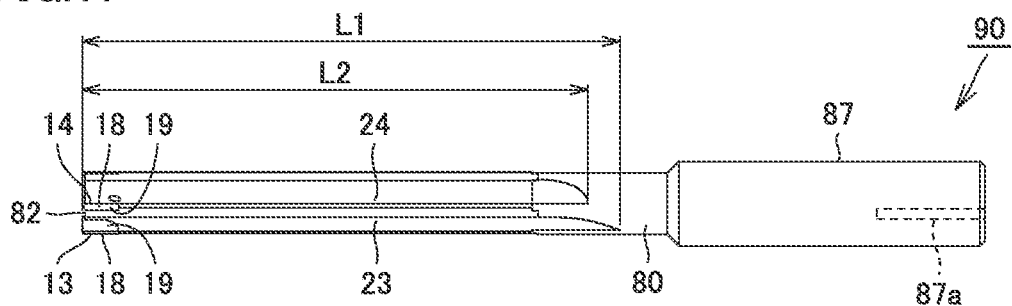
FIG. 17 is a bottom view of the reamer as viewed from the direction indicated by the arrow XVII in FIG. 15.
Figure 18:
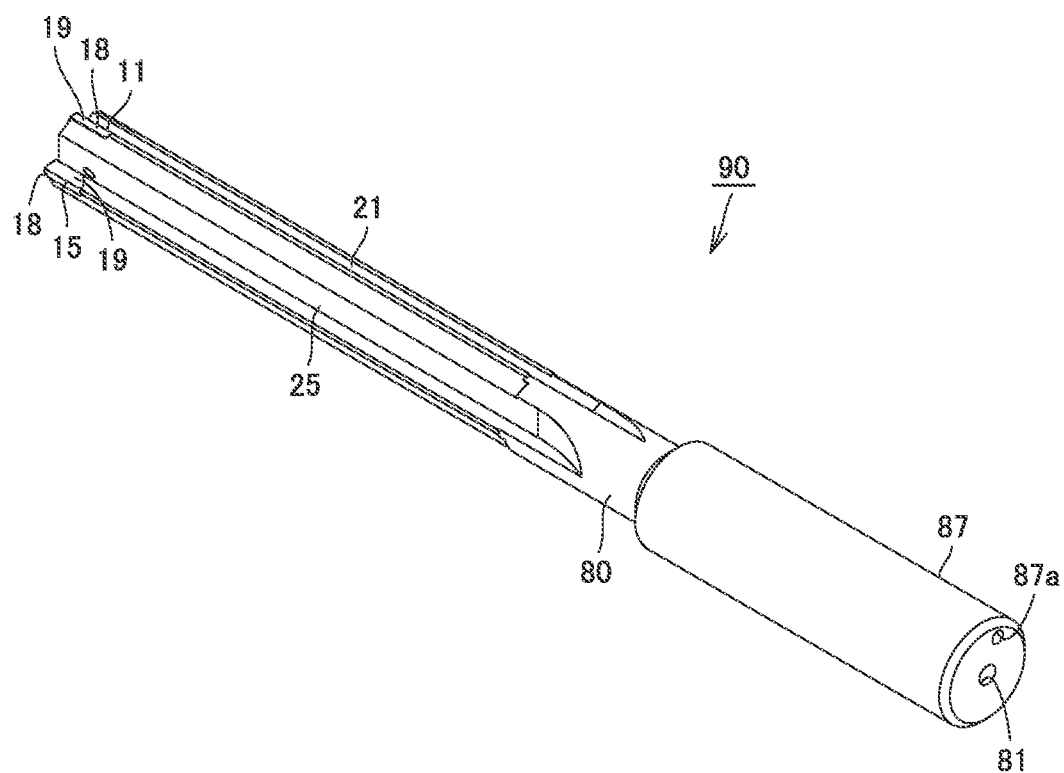
FIG. 18 is a perspective view of the reamer according to Embodiment 2.
Figure 19:
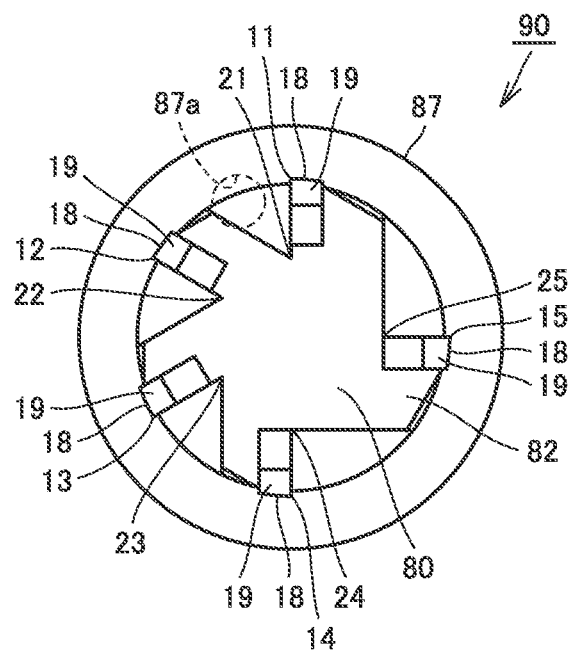
FIG. 19 is a left lateral view of the reamer as viewed from the direction indicated by the arrow XIX in FIG. 15.

FIG. 15 is a front view of a reamer according to Embodiment 2. FIG. 16 is a plan view of the reamer as viewed from the direction indicated by the arrow XVI in FIG. 15. FIG. 17 is a bottom view of the reamer as viewed from the direction indicated by the arrow XVII in FIG. 15. FIG. 18 is a perspective view of the reamer according to Embodiment 2. FIG. 19 is a left lateral view of the reamer as viewed from the direction indicated by the arrow XIX in FIG. 15.

As shown in FIGS. 15 to 19, reamer 90 includes core 80 and outer-circumference cutting edges 11 to 15 provided on the outer circumference of core 80 and made of diamond or CBN, which is a hard tool material. Core 80 extends from front end 82 to the rear end (shank 87) of reamer 90. Core 80 is provided with flutes 21 to 25 from front end 82 to the rear end of core 80. A hole 87a, serving as a center-of-gravity adjustment portion that adjusts a deviation of the position of the center of gravity from the center of rotation, is provided in a part of shank 87 at least partially from terminal end 21a of flute 21 on the rear end side to the rear end of core 80. The center-of-gravity adjustment portion causes a deviation of the center of gravity from the center of rotation to be smaller than when the center-of-gravity adjustment portion is not provided.

Figure 20:
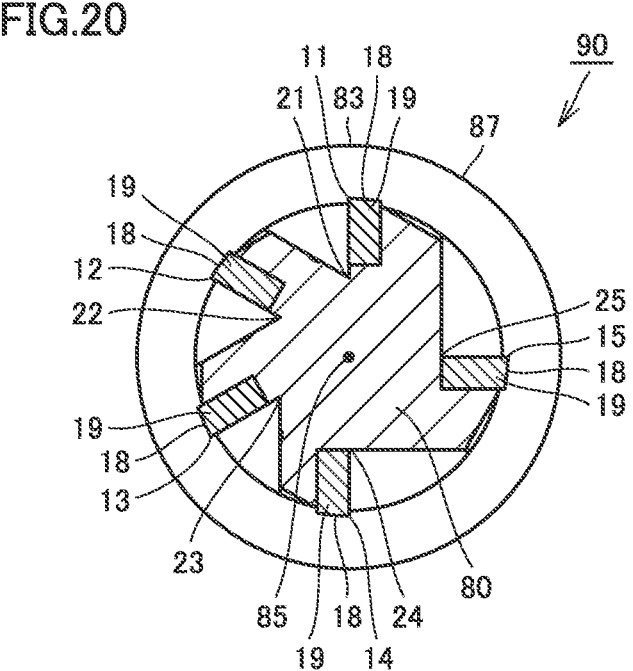
FIG. 20 is a sectional view taken along the line XX-XX in FIG. 15.
Figure 21:
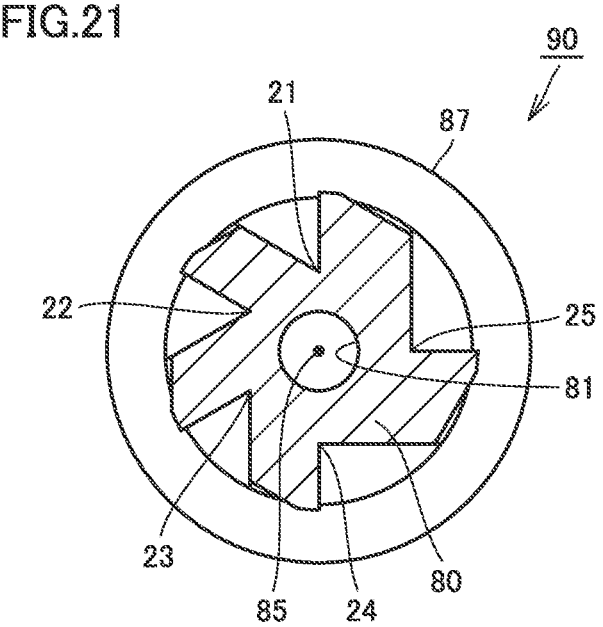
FIG. 21 is a sectional view taken along the line XXI-XXI in FIG. 15.

FIG. 20 is a sectional view taken along the line XX-XX in FIG. 15. FIG. 21 is a sectional view taken along the line XXI-XXI in FIG. 15. FIGS. 20 and 21 respectively correspond to FIGS. 7 and 9.

Figure 22:
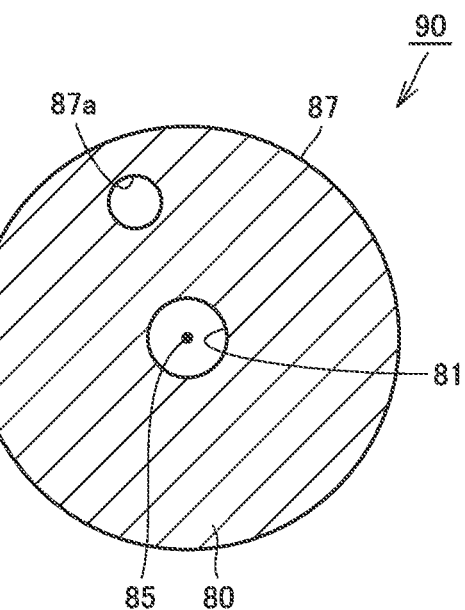
FIG. 22 is a sectional view taken along the line XXII-XXII in FIG. 15.

FIG. 22 is a sectional view taken along the line XXII-XXII in FIG. 15. As shown in FIG. 22, shank 87 is provided with hole 87a. Hole 87a lightens the part at which hole 87a is provided, and accordingly, the center of gravity deviates opposite to hole 87a.

Core 80 has shank 87 that is held by a tool machine, and shank 87 is provided with hole 87a serving as the center-of-gravity adjustment portion.

Comparative Example: Aluminum Alloy was Processed with Polycrystalline Diamond

TABLE 1

| Sample No. | Tool | Amount of eccentricity mm | Round-ness | Cylindricity |
|---|---|---|---|---|
| 1 | Without lightened portion | 0.174 | B | B |
| 2 | Without lightened portion | 0.052 | B | B |
| 3 | With lightened portion | 0.049 | A | A |
| 4 | With lightened portion | 0.032 | A | A |
| 5 | With lightened portion | 0.030 | AA | AA |
| 6 | With lightened portion | 0.001 | AA | AA |

First, reamers 90 (samples 1 and 2) of the shape of reamer 90 of Embodiment 1 without lightened portion 29 were prepared. Core 80 is made of cemented carbide. Hard tool insert 19 is made of polycrystalline diamond.

An amount of eccentricity in reamer 90 (a distance from the axis of rotation to the position of the center of gravity of reamer 90) was measured.

The amount of eccentricity is measured as follows. First, a reamer is attached to a high-accuracy tool balancer. An example of the high-accuracy tool balancer is Tool Dynamic TD Comfort available from HAIMER.

When reamer 90 is rotated, a figure of imbalance is displayed. For example, 14.3 gmm is displayed. The mass of reamer 90 is measured. For example, it is assumed that the reamer has a mass of 200 g. An amount of eccentricity can be obtained by dividing the amount of imbalance by the mass of a tool. In the above example, the amount of eccentricity is 14.3 gmm/200 g=0.0715 mm.

Figure 23:
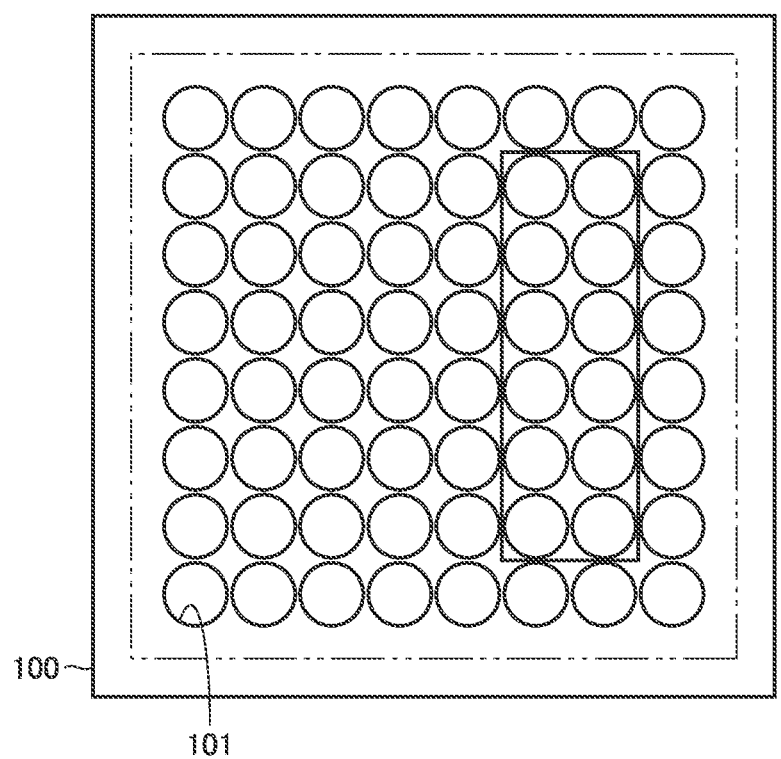
FIG. 23 is a plan view of a workpiece provided with holes.
Figure 24:
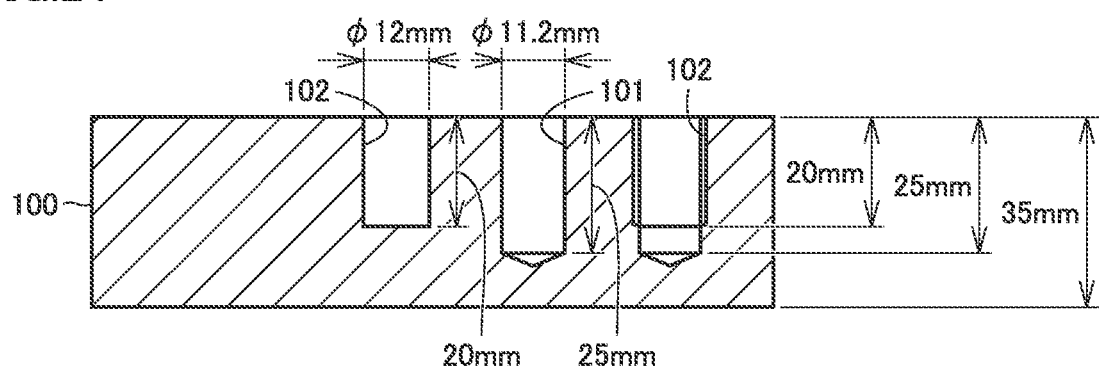
FIG. 24 is a sectional view of the workpiece provided with the holes.

Samples 1 and 2 have amounts of eccentricity shown in Table 1. Subsequently, a work test was performed using samples 1 and 2. FIG. 23 is a plan view of a workpiece provided with holes. FIG. 24 is a sectional view of the workpiece provided with the holes. As shown in FIGS. 23 and 24, first, holes 101 were formed in a workpiece 100 (ADC12 (JIS H 5302 2006)) with a drill. Holes 101 were processed with reamers 90 being samples 1 and 2, to thereby form finished holes 102. Table 2 shows the conditions for creating finished holes 102.

TABLE 2

| Evaluation conditions | |
|---|---|
| Workpiece | ADC12 (JIS H 5302 2006) |
| Cutting fluid | Water-soluble emulsion (8%) |
| Blade diameter | ϕ12.000 mm |
| Cutting rate | Vc = 200 m/min |
| Feed rate | f = 0.3 mm/rev |

The roundness and cylindricity of finished hole 102 were measured in accordance with the requirements in JIS B0621 (1984) with a roundness and cylindrical profile measuring instrument (e.g., RONDCOM 65A available from Tokyo Seimitsu Co., LTD.). Measured data is a numerical value measured by the minimum zone circle (MZC) method. Table 1 shows the results.

Table 3 shows the contents of evaluation criteria (AA, A, B) of roundness and cylindricity in Table 1.

TABLE 3

| Roundness | | Cylindricity | |
|---|---|---|---|
| B | Not less than 5 μm | B | Not less than 6 μm |
| A | Not less than 3 μm and less than 5 μm | A | Not less than 4 μm and less than 6 μm |
| AA | Less than 3 μm | AA | Less than 4 μm |

Example: Aluminum Alloy was Processed with Polycrystalline Diamond

Reamers 90 (samples 3 to 6 in Table 1) of the shape of reamer 90 of Embodiment 1 with lightened portion 29 were prepared. Core 80 is made of cemented carbide. Hard tool insert 19 is made of polycrystalline diamond.

An amount of eccentricity in reamer 90 (a distance from the axis of rotation to the position of the center of gravity of reamer 90) was measured. Table 1 shows amounts of eccentricity.

Subsequently, a work test was performed using samples 3 to 6. As shown in FIGS. 23 and 24, first, holes 101 were formed in workpiece 100 (ADC12 (JIS H 5302 2006)) with a drill. Holes 101 were processed with reamers 90 being samples 3 to 6, to thereby form finished holes 102. Table 2 shows the conditions for creating finished holes 102.

The roundness and cylindricity of finished hole 102 were measured. Table 1 shows the results.

As shown in Table 1, in samples 3 to 6 provided with a lightened portion, an amount of eccentricity was 0.05 mm or less, and accordingly, roundness and cylindricity were rated "A" or "AA". It was found that in samples 1 and 2 without a lightened portion, in contrast, an amount of eccentricity was greater than 0.05 mm, and accordingly, both of roundness and cylindricity were rated "B".

Comparative Example: Cast Iron was Processed with CBN Sintered Body

TABLE 4

| Sample No. | Tool | Amount of eccentricity mm | Roundness | Cylindricity |
|---|---|---|---|---|
| 7 | Without lightened portion | 0.085 | B | B |
| 8 | Without lightened portion | 0.051 | B | B |
| 9 | With lightened portion | 0.048 | A | A |
| 10 | With lightened portion | 0.035 | A | A |
| 11 | With lightened portion | 0.028 | AA | AA |
| 12 | With lightened portion | 0.012 | AA | AA |

Reamers 90 (samples 7 and 8) of the shape of reamer 90 of Embodiment 1 without lightened portion 29 were prepared. Core 80 is made of cemented carbide. Hard tool insert 19 is made of CBN sintered body.

An amount of eccentricity in reamer 90 (a distance from the axis of rotation to the position of the center of gravity of reamer 90) was measured.

Samples 7 and 8 have amounts of eccentricity shown in Table 4.

Subsequently, a work test was performed using samples 7 and 8. FIG. 23 is a plan view of a workpiece provided with holes. FIG. 24 is a sectional view of the workpiece provided with the holes. As shown in FIGS. 23 and 24, first, holes 101 were formed in workpiece 100 (FC250 (JIS G 5501 1995)) with a drill. Holes 101 were processed with reamers 90 being samples 7 and 8, to thereby form finished holes 102. Table 5 shows the conditions for creating finished holes 102.

TABLE 5

| Evaluation conditions | |
|---|---|
| Workpiece | FC250 (JIS G 5501 1995) |
| Cutting fluid | Water-soluble emulsion (8%) |
| Blade diameter | ϕ12.000 mm |
| Cutting rate | Vc = 250 m/min |
| Feed rate | f = 0.25 mm/rev |

The roundness and cylindricity of finished hole 102 were measured in accordance with the requirements in JIS B0621 (1984) with a roundness and cylindrical profile measuring instrument (e.g., RONDCOM 65A available from Tokyo Seimitsu CO., LTD.). Measured data is a numerical value measured by the MZC method. Table 4 shows the results.

Table 6 shows the contents of evaluation criteria (AA, A, B) of roundness and cylindricity in Table 4.

TABLE 6

| Roundness | | Cylindricity | |
|---|---|---|---|
| B | Not less than 5 μm | B | Not less than 6 μm |
| A | Not less than 3 μm and less than 5 μm | A | Not less than 4 μm and less than 6 μm |
| AA | Less than 3 μm | AA | Less than 4 μm |

Example: Cast Iron was Processed with CBN Sintered Body

Reamers 90 (samples 9 to 12 in Table 4) of the shape of reamer 90 of Embodiment 1 with lightened portion 29 were prepared. Core 80 is made of cemented carbide. Hard tool insert 19 is made of CBN sintered body.

An amount of eccentricity in reamer 90 (a distance from the axis of rotation to the position of the center of gravity of reamer 90) was measured. Table 4 shows amounts of eccentricity.

Subsequently, a work test was performed using samples 9 to 12. As shown in FIGS. 23 and 24, first, holes 101 were formed in workpiece 100 (FC250 (JIS G 5501 1995)) with a drill. Holes 101 were processed with reamers 90 being samples 9 to 12, to thereby form finished holes 102. Table 5 shows the conditions for creating finished holes 102.

The roundness and cylindricity of finished hole 102 were measured. Table 4 show the results.

As shown in Table 4, in samples 9 to 12 provided with a lightened portion, an amount of eccentricity was 0.05 mm or less, and accordingly, roundness and cylindricity were rated "A" or "AA". It was found that in samples 7 and 8 without a lightened portion, in contrast, an amount of eccentricity was greater than 0.05 mm, and accordingly, both of roundness and cylindricity were rated "B".

It should be understood that the embodiments and examples disclosed herein are illustrative and non-restrictive in every respect. The scope of the present invention is defined by the terms of the claims, rather than the embodiments and examples above, and is intended to include any modifications within the scope and meaning equivalent to the terms of the claims.

REFERENCE SIGNS LIST

11, 12, 13, 14, 15 outer-circumference cutting edge; 18 margin; 19 hard tool insert; 21, 22, 23, 24, 25 flute; 21a terminal end; 29 lightened portion; 80 core; 80a blade effective region; 80b balance adjustment region; 80c chuck region; 81 oil hole; 82 front end; 85 center of rotation; 86 center of gravity; 87 shank; 87a, 101 hole; 90 reamer; 100 workpiece; 102 finished hole.

The invention claimed is:

1. A reamer comprising: a core; and a plurality of outer-circumference cutting edges provided on an outer circumference of the core and made of a hard tool material, the core extending from a front end to a rear end, the core being provided with a plurality of flutes extending from the front end toward the rear end, a center-of-gravity adjustment portion being provided at least partially from terminal ends of the plurality of flutes on a rear end side toward the rear end of the core, the center-of-gravity adjustment portion causing the distance from the center of rotation to the center of gravity to be smaller than when the center-of-gravity adjustment portion is not provided, wherein the center-of-gravity adjustment portion is a lightened portion provided at a terminal end of one of the plurality of flutes, the lightened portion being a material reduction of a portion of the core.

2. A reamer comprising: a core; and a plurality of outer-circumference cutting edges provided on an outer circumference of the core and made of a hard tool material, the core extending from a front end to a read end, the core being provided with a plurality of flutes extending from the front end toward the rear end, a center-of-gravity adjustment portion being provided at least partially from terminal ends of the plurality of flutes on a rear end side toward the rear end of the core, the center-of-gravity adjustment portion causing the distance from the center of rotation to the center of gravity to be smaller than when the center-of-gravity adjustment portion is not provided, wherein the plurality of outer-circumference cutting edges have first to third outer-circumference cutting edges adjacent to each other, and a phase difference between the first and second outer-circumference cutting edges is smaller than a phase difference between the second and third outer-circumference cutting edges, and, wherein the center-of-gravity adjustment portion is provided at a phase corresponding to between the first and second outer-circumference cutting edges.

* * * * *